(12) United States Patent  
Watanabe

(10) Patent No.: US 7,404,313 B2  
(45) Date of Patent: Jul. 29, 2008

(54) SCANNING PROBE MICROSCOPE

(75) Inventor: Kazutoshi Watanabe, Chiba (JP)

(73) Assignee: SII NanoTechnology Inc. (JP)

( * ) Notice: Subject to any disclaimer, the term of this patent is extended or adjusted under 35 U.S.C. 154(b) by 65 days.

(21) Appl. No.: 11/374,842

(22) Filed: Mar. 14, 2006

(65) Prior Publication Data  
US 2006/0207317 A1 Sep. 21, 2006

(30) Foreign Application Priority Data  
Mar. 15, 2005 (JP) ............................. 2005-072260

(51) Int. Cl.  
G01B 5/28 (2006.01)  
G01N 13/16 (2006.01)  
G01N 13/20 (2006.01)
(52) U.S. Cl. ........................................................ 73/105
(58) Field of Classification Search .................... 73/105  
See application file for complete search history.

(56) References Cited  
U.S. PATENT DOCUMENTS  
6,100,524 A * 8/2000 Yagi et al. .................... 250/306  
6,422,069 B1 * 7/2002 Shimizu et al. ............... 73/105

* cited by examiner

Primary Examiner—Daniel S Larkin  
(74) Attorney, Agent, or Firm—Adams & Wilks

(57) ABSTRACT

A scanning probe microscope has a self-detection type probe structure including a cantilever having an electrically conductive probe at a distal end thereof, a supporting part, and a piezoresistance element whose resistance value changes depending on the deflection of the cantilever. A detector applies a predetermined voltage to the piezoresistance element and detects the value of the current passing through the piezoresistance element to detect deflection of the cantilever. A sample table mounts a sample such that a surface of the sample confronts a tip of the probe, and a moving mechanism relatively moves the sample table and the probe tip in X,Y and Z directions. A controller controls the moving mechanism to maintain a fixed distance between the probe tip and the sample surface and measures the surface shape of the sample on the basis of the detection result of the detector. A predetermined voltage is applied between the probe and the sample surface, and a measuring part operates simultaneously with the detector and measures electrical property information caused by the applied voltage.

4 Claims, 2 Drawing Sheets

SCANNING PROBE MICROSCOPE

BACKGROUND OF THE INVENTION

1. Field of the Invention

The present invention relates to a scanning probe microscope having a self detection type probe including a piezoresistance element.

2. Description of the Related Art

An atomic force microscope (AFM) serving as one of a scanning probe microscope (SPM) is used for various electrical property measurements such as a current measurement, a dielectric measurement, and a potential measurement by a Kelvin probe force microscope or the like other than the surface shape measurement of a sample. The AFM carries out various electrical property measurements by using a cantilever provided with a probe having a conductive property at its front end.

Upon this measurement, deflection (warpage) of the cantilever is measured in a system called an optical lever system and depending on this measurement result, a distance between the probe tip and the surface of a sample is always controlled constant.

This optical lever is a system that measures the deflection of the cantilever by irradiating a laser light toward a reflection face formed on the rear surface of the cantilever from a light source and detecting the laser light reflected on the reflection face by a photo detector that is divided into two or four. In other words, if the cantilever is detected in compliance with irregularities of the surface of the sample, a reflection position of the laser light is different depending on the deflection, so that the incoming position of the laser light to be inputted in the photo detector is different. Therefore, by detecting this incoming position of the laser light, the deflection of the cantilever can be measured.

In addition, by feedback-controlling a sample table having the sample mounted thereon in a direction perpendicular to the surface of the sample on the basis of the deflection of the cantilever detected in the optical lever, as described above, it is possible to scan the sample while always controlling the distance between the probe tip and the surface of the sample constant.

In addition, in this case, by scanning the sample and applying a predetermined voltage and current to the cantilever, it is possible to carry out electric measurement of the sample. [Patent document 1] JP-A-2004-294218 [Non-patent document 1] By Alexander Olbrich et al., Applied Physics Letters, volume 73, number 21 (US), "Conducting atomic force microscopy for nanoscale electrical characterization of thin $SiO_2$", 23 Nov. 1998, P. 3114-3116 [Non-patent document 2] By Yasuo Cho et al., Applied Physics Letters, volume 75, number 18 (US), "Scanning nonlinear dielectric microscopy with nanometer resolution", 1 Nov. 1999, P. 2833-2835 [Non-patent document 3] By Joseph J. Kopanski et al., Materials Science and Engineering B44, "Scanning capacitance microscopy applied to two-dimensional dopant profiling of semiconductors", 1997, P. 46-51 [Non-patent document 4] By R. Shikler et al., Applied Physics Letter, volume 74, number 20 (US), "Potential imaging of operating light-emitting devices using Kelvin force microscopy", 17 May 1999, P. 2972-2974.

However, the measurement method of the electric property by the above-described conventional optical lever system involves the following problems.

In other words, there is a disadvantage that the laser light is partially irradiated on the surface of the sample that is a target of the measurement as leaked laser light, hereinafter referred to as light leak, upon irradiation of the laser light from the light source to the cantilever in the optical lever system. Accordingly, the measured electrical property turns out to be a property of the sample on which the light leak in the optical lever system is irradiated. In other words, the light of the sample is excited by the light leak leading to a noise, so that the true electrical property of the sample cannot be measured.

SUMMARY OF THE INVENTION

The present invention has been made taking the foregoing problems into consideration and an object of the present invention is to provide a scanning probe microscope that can measure the electrical property of a sample with a high degree of accuracy without being affected by light leak.

In order to attain the above-described object, the present invention provides the following means.

(1) The scanning probe microscope according to the present invention, which measures the electrical property information of a sample with a probe having a conductive property contacting or being close to a surface of the sample, may comprise a self-detection type probe including a cantilever having a probe disposed at its front end, a supporting part that supports a base end side of the cantilever in a cantilevered condition, and a piezoresistance element whose resistance value is changed depending on the deflection of the cantilever; detecting means that applies a predetermined voltage to the piezoresistance element and detects the value of the current passing through the piezoresistance element so as to detect the deflection of the cantilever; a sample table for mounting the sample confronting the probe tip; moving means that relatively moves the sample table and the probe tip along X and Y directions that are parallel to the surface of the sample and a Z direction that is perpendicular to the surface of the sample; control means that controls the moving means so that a distance between the probe tip and the surface of the sample is fixed and measures the surface shape of the sample on the basis of the detection result of the detecting means; applying means that applies a predetermined voltage between the probe tip and the surface of the sample; and measuring means that measures the electrical property information caused by the voltage applied by the applying means; wherein the probe is elongated to the base end side of the cantilever and is electrically connected to a conducting film that can be electrically connected to the measuring means.

In the scanning probe microscope of the present invention, at first, the probe tip is brought into contact with or close to the surface of the sample, scanning is carried out by the moving means moving the sample table and the probe tip along the X and Y directions that are parallel to the surface of the sample. In this case, by means of the detecting means, a predetermined voltage is applied to the piezoresistance element and the value of the current passing through the piezoresistance element is detected. Then, the mutual action due to an atomic force acting between the probe tip and the sample works on the probe, so that the cantilever is displaced (deflected) depending on the irregularities of the surface of the sample when scanning. When the cantilever is displaced, in accordance with this, the piezoresistance element is also displaced and the resistance value is displaced. Therefore, the detecting means can detect the displacement amount of the cantilever on the basis of the detected current value.

The controlling means controls the moving means on the basis of this detection result, namely, the displacement amount of the cantilever so as to move the sample table along the Z direction and always fixes the distance between the probe and the surface of the sample. In addition, the controlling means measures the surface shape (the concavo-convex shape) of the sample by relating the shift amount to the Z direction to the scanning amount in the X and Y directions.

In addition, upon scanning, the applying means applies a predetermined voltage (a direct current voltage, an AC current voltage or the like) between the surface of the sample and the probe tip. Then, the measuring means measures various electrical property information (for example, the surface potential distribution of the sample or the like) caused by the applied voltage via the conducting film and the probe tip having the conductive property.

Thus, since the scanning probe microscope of the present invention has a probe having a conductive property, the electrical property of the sample can be measured as well as measurement of the surface shape of the sample.

Particularly, since the scanning probe microscope of the present invention is provided with the self detection type probe having the piezoresistance element, upon measurement of the displacement (deflection) of the cantilever, it is not necessary to irradiate the laser light on the reflection face of the cantilever differently from the conventional optical lever system. Therefore, differently from the conventional optical lever system, the laser light does not leak to the side of the sample and the light of the sample is not excited by the light leak. Accordingly, without being affected by the light leak causing a noise, the electrical property can be measured with a high degree of accuracy and the true electrical property of the sample can be checked.

In addition, in the scanning probe microscope according to the present invention as in (1), the probe tip and the surface of the sample are arranged so as to contact each other, and the measuring means may comprise current measuring means that measures a current flowing between the probe tip and the surface of the sample.

In the scanning probe microscope according to this invention, the probe tip and the surface of the sample are brought into a contacting state (a contact mode) and in this state, the scanning probe microscope performs scanning in the X and Y directions. Then, upon scanning, the current measuring means measures the current flowing between the probe tip and the surface of the sample by the voltage applied by the applying means. As a result, not being affected by the light leak, the surface shape of the sample and the current distribution of the surface of the sample can be measured at the same time with a high degree of accuracy.

Further, in the scanning probe microscope according to the present invention as in (1), the probe tip and the surface of the sample are arranged so as to contact each other; and the measuring means may comprise capacitance measuring means that measures a capacitance flowing between the probe tip and the surface of the sample.

In the scanning probe microscope according to this invention, the probe tip and the surface of the sample are brought into a contacting state (a contact mode) and in this state, the scanning probe microscope performs scanning in the X and Y directions. Then, upon scanning, the capacitance measuring means measures, for example, the capacitance due to the change of the thickness of a vacant layer generated on the sample by the voltage between the probe tip and the surface of the sample. As a result, not being affected by the light leak, the surface shape of the sample and the permittivity distribution of the surface of the sample can be measured at the same time with a high degree of accuracy.

Further, the scanning probe microscope according to the present invention as in (1) may further comprise vibration means that vibrates the cantilever with a predetermined resonance frequency, wherein the probe and the surface of the sample are arranged so as to be close to each other; the applying means applies an AC voltage and a direct current as the predetermined voltage; and the measuring means may comprise potential measuring means that measures a potential of the surface of the sample on the basis of the displacement amount of the cantilever with respect to a an electrostatic force generated in a composite electric field due to the applied AC voltage and DC voltage.

In the scanning probe microscope according to this invention, the probe tip is vibrated with a predetermined resonance frequency by the vibration means being close to the surface of the sample. In this state, the applying means applies the AC voltage and the DC voltage between the probe tip and the surface of the sample to generate a composite electric field. Then, the potential measuring means measures the displacement amount of the cantilever with respect to the electrostatic force generated in the composite electric field and this makes it possible to measure the potential of the surface of the sample. As a result, not being affected by the light leak, the surface shape of the sample and the potential distribution of the surface of the sample can be measured at the same time with a high degree of accuracy.

Since the scanning probe microscope according to this invention is provided with the self detection type probe having the piezoresistance element, it is not necessary to irradiate the laser light on the reflection face of the cantilever differently from the conventional optical lever system. Therefore, differently from the conventional optical lever system, the laser light does not leak to the side of the sample and the light of the sample is not excited by the light leak. Accordingly, without being affected by the light leak casing a noise, the electrical property can be measured with a high degree of accuracy and the true electric property of the sample can be checked.

DETAILED DESCRIPTION OF THE INVENTION

Figure 1:
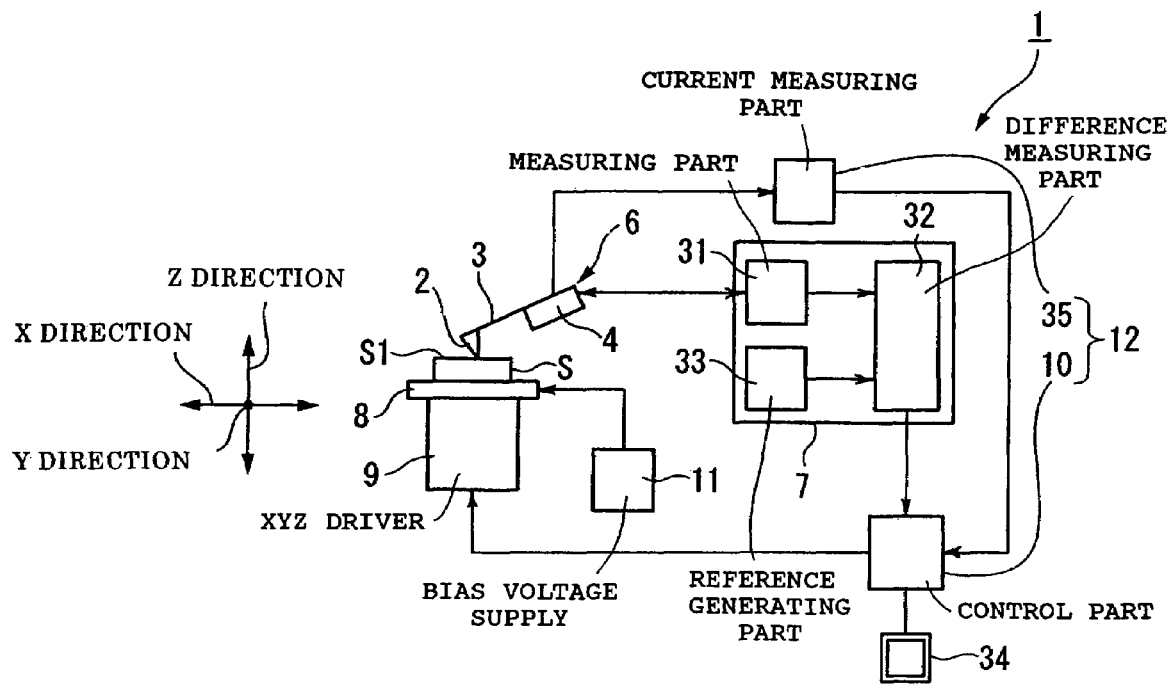
FIG. 1 is a block diagram showing an embodiment of a scanning probe microscope according to the present invention.

With reference to FIGS. 1 to 4, an embodiment of the scanning probe microscope according to the present invention will be described below. Further, according to the present embodiment, the case of measuring the current distribution of the surface of the sample as the electrical property information will be explained as an example.

A scanning probe microscope 1 of the present embodiment may measure the electrical property information of a sample S with a probe 2 having a conductive property contacting or being close to a surface S1 of the sample. The scanning probe microscope 1 of the present embodiment comprises a self-detection type probe structure 6 (hereinafter referred to as a self-detection type probe) which includes a cantilever 3 having a probe 2 disposed at its front end, a supporting part 4 that supports a base end side of the cantilever 3 in a cantilevered fashion, and a piezoresistance element 5 whose resistance value is changed depending on the deflection amount of the cantilever 3; detecting means 7 that applies a predetermined voltage to the piezoresistance element 5 and detects the value of the current passing through the piezoresistance element 5 so as to detect the amount of deflection of the cantilever 3; a sample table 8 for mounting the sample S confronting the probe tip; a three dimensional driving mechanism (moving means) 9 that relatively moves the sample table 8 and the probe 2 along X and Y directions in parallel with the surface of the sample S1 and a Z direction perpendicular to the surface of the sample S1; a control part (control means) 10 that controls the three dimensional driving mechanism 9 on the basis of the detection result of the detecting means 7 so that a distance between the tip of the probe 2 and the surface of the sample S1 is constant and measures the surface shape of the sample S; a bias voltage supplying part (applying means) 11 that applies a predetermined voltage between the probe 2 and the surface of the sample S1; and measuring means 12 that measures the electrical property information caused by the voltage applied to the bias voltage supplying part 11.

Figure 2:
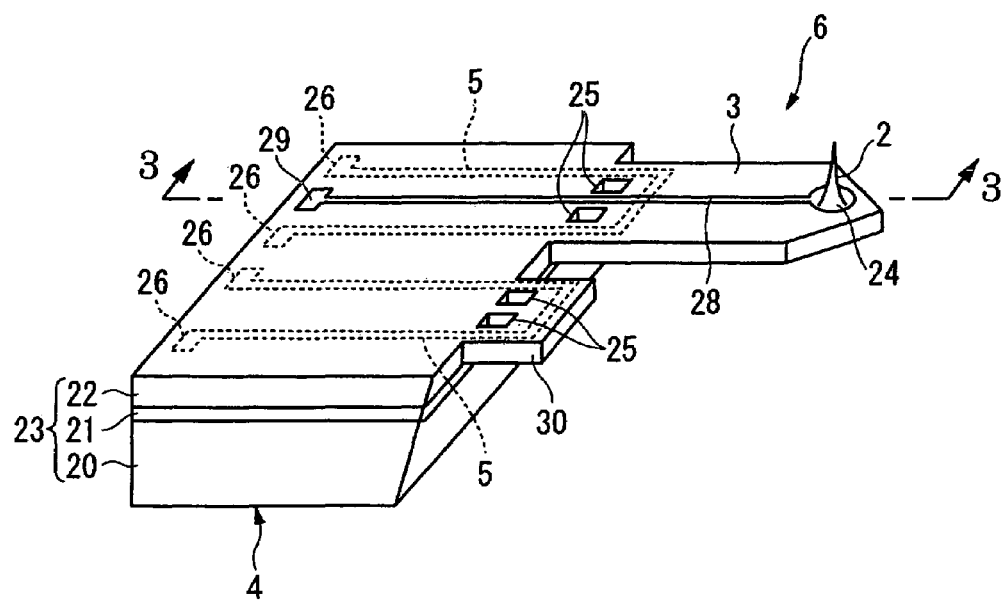
FIG. 2 is a perspective view showing a self detection type probe of the scanning probe microscope shown in FIG. 1.
Figure 3:
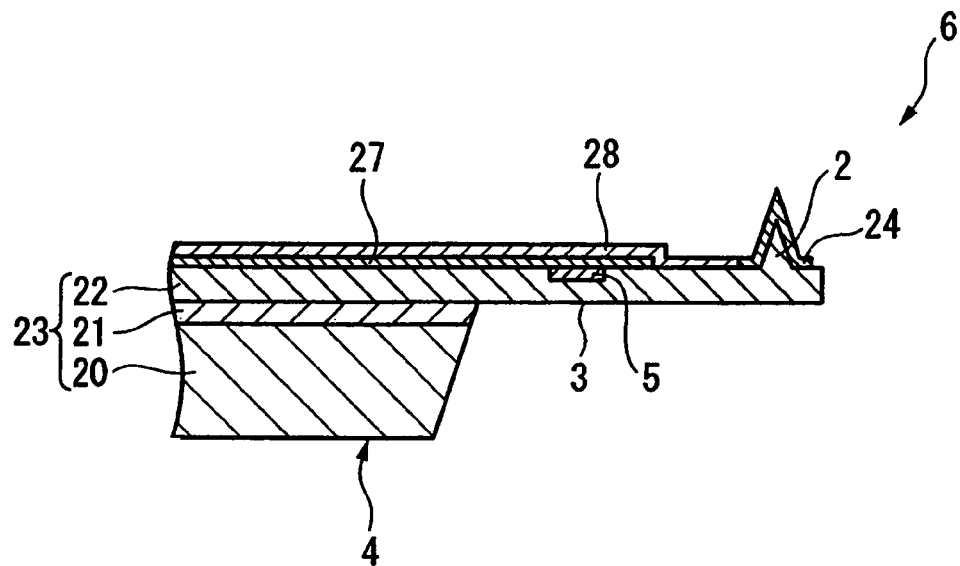
FIG. 3 is a sectional view taken along the line 3-3 of the self detection type probe shown in FIG. 2.

As shown in FIG. 2 and FIG. 3, the self detection type probe 6 according to the present embodiment is manufactured by forming an oxide layer (a silicon dioxide layer) 21 on a silicon supporting layer 20 and further, using a silicon on insulator (SOI) substrate 23 pasting a silicon active layer 22 on the oxide layer 21.

Then, the cantilever 3 and the probe 2 are formed by the silicon active layer 22, and the supporting part 4 is formed by three layers, namely, the silicon supporting layer 20, the oxide layer 21, and the silicon active layer 22. Further, the probe 2 is coated with a metal film 24 and has a conductive property.

In addition, at the base end side of the cantilever 3 serving as a connection part of the cantilever 3 and the supporting part 4, two openings 25 are formed to improve the flexibility of the cantilever 3 so that it more easily bends and deflects at the base end side. Further, the number of openings 25 is not limited to two and the openings 25 may be freely formed and disposed or they may be omitted altogether.

The piezoresistance element 5 is formed in a U-shape over the supporting part 4 and the base end side of the cantilever 3 and at the opposite ends located at the supporting part 4, outer connection terminals 26 are provided that can be electrically connected to the outside of the self-detection type probe 6. In other words, the piezoresistance element 5 enters the base end side of the cantilever 3 through the outside of one opening 25 from one of the outside connection terminals 26 and then, the piezoresistance element 5 returns to the supporting part 4 again through the outside of the other opening 25 so as to be electrically connected to the other one of the outside connection terminals 26. In addition, impurities are injected on the silicon active layer 22 by an ion injection method, a diffusion method or the like to form this piezoresistance element 5.

In addition, as shown in FIG. 3, an insulating film 27 is formed so as to cover the piezoresistance element 5 over the supporting part 4 and the base end side of the cantilever 3. Thereby, the piezoresistance element 5 is electrically insulated from the outside.

In addition, as shown in FIG. 2 and FIG. 3, the probe 2 is elongated to the base end side of the cantilever 3 and further, the probe 2 is electrically connected to a conducting film 28 that is formed along the center of the cantilever 3 so as to pass through the space between the two openings 25. Then, one end side of the conducting film 28 is electrically connected to the metal film 24 covering the probe 2 and the other end side of the conducting film 28 is electrically connected to an outside connection terminal 29 that can be electrically connected to the measuring means 12. In addition, this conducting film 28 is formed on the insulating film 27 to be electrically independent from the piezoresistance element 5.

In addition, the self detection type probe 6 according to the present embodiment is adjacent to the cantilever 3, and a reference lever 30 for establishing reference conditions is supported by the supporting part 4 in a cantilevered fashion. The reference lever 30 is formed so as to be slightly shorter than the cantilever 3 and like the cantilever 3, the reference lever 30 has two openings 25 formed at its base end side and is provided with a piezoresistance element 5. This reference lever 30 is used for temperature compensation of the piezoresistance element 5.

Further, this reference lever 30 is not always necessary to be disposed on the self detection type probe 6.

As shown in FIG. 1, the sample table 8 is mounted on the three dimensional driving mechanism 9 to minutely move along the X and Y directions and the Z direction. Thereby, the sample table 8 and the probe 2 relatively move in three directions, namely, the X, Y, and Z directions. In addition, this three dimensional driving mechanism 9 is a piezoelectric element that can move in the three directions, for example, and depending on the applied voltage, the sample table 8 and the probe 2 relatively move in the three directions.

In addition, the bias voltage supplying part 11 is connected to the sample table 8 and via the sample table 8, the voltage can be applied between the surface of the sample S1 and the probe 2.

A measuring part 31 is electrically connected to the outside connection terminals 26 of the piezoresistance element 5. This measuring part 31 may apply a predetermined voltage to the piezoresistance element 5 to supply a current and may detect the value of this current. The measuring part 31 may amplify an output signal in accordance with the detected current value and then, the measuring part 31 may output the amplified output signal to a difference measuring part 32.

In addition, for example, when the detection amount (the displacement amount) of the cantilever 3 is "0", a reference signal having the output of the difference measuring part 32 of "0" is inputted in this difference measuring part 32 from a reference generating part 33. Then, the difference measuring part 32 compares this reference signal with the output signal to be sent from the current measuring part 31 and outputs an error signal that is a difference between the reference signal and the output signal to the control part 10. In other words, this error signal corresponds to the displacement amount of the cantilever 3. The measuring part 31, the difference measuring part 32, and the reference generating part 33 constitute the detecting means 7.

In addition, the control part 10 may minutely move the sample table 8 in the Z direction by applying the voltage to the three dimensional driving mechanism 9 so that the sent error signal comes close to "0". Thereby, the distance between the probe tip and the surface of the sample S1 is controlled so as to be always constant. In addition, the control part 10 may measure the surface shape (the concavo-convex shape) of the sample S relating the error signal (the shift amount to the Z direction) to the scanning amount in the X and Y directions, simultaneously with controlling this three dimensional driving mechanism 9 and then, the control part 10 may display a surface shape image (the dimensional image information) on a display part 34. In the meantime, the control part 10 may control respective components comprehensively.

In addition, the measuring means 12 is provided with a current measuring part 35 (the current measuring means) that measures the current flowing between the probe 2 and the surface of the sample S1. This current measuring part 35 is electrically connected to the conducting film 28 that is electrically connected to the probe 2 via the outside connection terminal 29 and measures the current flowing between the probe 2 and the surface of the sample S1 by the bias voltage supplying part 11. Then, the current measuring part 35 outputs the change of the measured current value to the control part 10. In addition, the control part 10 measures the current distribution of the surface of the sample S1 relating the change of the value of the current to the displacement amount in the X and Y directions and may display its result on the display part 34. In other words, the current measuring part 35 and the control part 10 constitute the measuring means 12.

Next, the case of measuring the surface shape of the sample S and the current distribution on the surface of the sample S by the scanning probe microscope 1 that has been configured in this way will be described below.

At first, the initial setting to contact the probe 2 and the surface of the sample S1 is done. In other words, after mounting the sample S on the sample table 8, the three dimensional driving mechanism 9 is slowly moved in the Z direction. In addition, in this case, applying a predetermined voltage to the piezoresistance element 5 from the measuring part 31, the current flowing through the piezoresistance element 5 is detected. When the surface of the sample S1 contacts the tip of the probe 2 due to movement of the sample table 8 in this state, the probe 2 is pushed by the sample S and this causes the cantilever 3 to be slightly deflected and displaced. In accordance with this, the piezoresistance element 5 is also displaced, so that the resistance value is changed and the current value to be measured by the measuring part 31 is changed. Accordingly, it is possible to certainly determine that the surface S1 of the sample 1 contacts the tip of the probe 2.

The control part 10 moves the sample table 8 till the current value to be measured by the measuring part 31 attains a predetermined value and stops the sample table 8 when it attains a predetermined value. Thereby, it is possible to certainly contact the surface of the sample S1 and the tip of the probe 2. Further, this state is the initial state that the cantilever 3 is not deflected and on the basis of this state, the reference generating part 33 may generate a reference signal.

After the initial setting is terminated, the three dimensional driving mechanism 9 may scan the sample moving the sample table 8 in the X and Y directions by the three dimensional driving mechanism 9 to start the measuring. In this case, a predetermined voltage is applied to the piezoresistance element 5 by the measuring part 31 and the value of the current flowing through the piezoresistance element 5 is detected. Since the tip of the probe 2 is pulled by the atomic force acting between the probe tip and the sample S, when performing scanning, the cantilever 3 is deflected and displaced depending on the irregularities of the surface of the sample S1. If the cantilever 3 is displaced, in accordance with this, the piezoresistance element 5 is also changed and the resistance value is changed. Therefore, the current value detected by the measuring part 31 is also changed. Then, the measuring part 31 may output the output signal in accordance with this current change to the difference measuring part 32.

The difference measuring part 32 may calculate an error signal in accordance with the displacement amount of the cantilever 3 comparing the sent output signal with the reference signal sent from the reference generating part 33. Further, the difference measuring part 32 may output the error signal to the control part 10.

Thereby, the control part 10 can detect the displacement amount of the cantilever 3 on the basis of the sent error signal. Then, the control part 10 may control the three dimensional driving mechanism 9 so as to move the sample table 8 in the Z direction on the basis of this error signal and it may make the distance between the probe 2 and the surface of the sample S1 constant. In other words, the control part 10 may control the sample table 8 so as to bring the error signal close to "0". Thereby, a contact pressure between the probe 2 and the surface of the sample S1 is always fixed.

In addition, the control part 10 may measure the surface shape (the concavo-convex shape) of the sample S relating the displacement amount in the Z direction of the cantilever 3 to the scanning amount thereof in the X and Y directions and it may display the surface shape image on the display part 34. Thereby, it is possible to observe the surface shape of the sample S.

In addition, upon scanning, the bias voltage supplying part 11 may apply a predetermined voltage between the surface of the sample 51 and the tip of the probe 2. Then, due to the applied voltage, the current flowing between the probe 2 and the surface of the sample 51 is measured by the current measuring part 35. In other words, the current measuring part 35 is electrically connected to the probe 2 having a conductive property via the conducting film 28, so that the current measuring part 35 can certainly measure the current flowing due to the applied voltage. Upon this measuring of the current, if a contacting place of the probe tip and the surface of the sample S1 is changed depending on scanning, the surface condition is also changed. Therefore, the current value to be measured is different in accordance with scanning. Then, the control part 10 can measure the current distribution on the surface of the sample S1 by relating the value of the measured current value to the displacement amount in the X and Y directions and displays its result on the display part 34.

Thus, since the present embodiment is provided with the conductive probe 2, the surface shape of the sample S and the electrical property information of the sample S, namely, the potential distribution of the surface of the sample S1, can be measured simultaneously.

Particularly, since the scanning probe microscope 1 according to the present embodiment is provided with the self detection type probe 6 having the piezoresistance element 5, upon measurement of the displacement (deflection) of the cantilever 3, it is not necessary to irradiate a laser light on the reflection face of the cantilever 3 differently from the conventional optical lever system. Therefore, laser light does not leak to the side of the sample S differently from the conventional case, so that the light of the sample S is not excited by the light leak. Accordingly, without being affected by the light leak causing a noise, the electrical property can be measured with a high degree of accuracy and the true electrical property of the sample 3 can be checked.

In addition, since the scanning probe microscope 1 according to the present embodiment is provided with the reference lever 30, it can remove the temperature effect of the piezoresistance element 5. In other words, the resistance value of the piezoresistance element 5 is also varied due to conditions other than the deflection, such as temperature. Therefore, by referring to the reference lever 30, it is possible to remove the unnecessary variation information and as described above, the effects due to temperature can be removed. As a result, it is possible to improve the reliability of the measuring result.

The technical scope of the present invention is not limited to the above-described embodiment and various modifications will become possible without departing from the scope thereof.

For example, according to the above-described embodiment, the potential distribution of the surface of the sample S1 is measured as the electrical property information, however, not limited to this case, measuring the capacitance of the surface of the sample S1, the permittivity distribution of the surface of the sample S1 may be measured. In this case, the measuring means 12 may be provided with capacitance measuring means 40 that measures the capacitance between the tip of the probe 2 and the surface of the sample S1.

Figure 4:
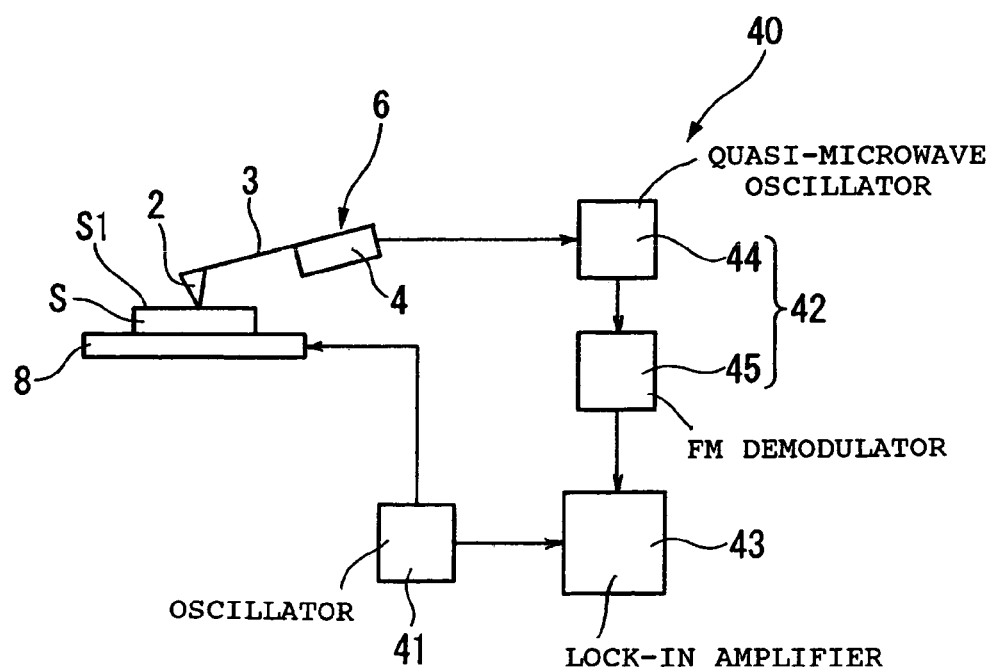
FIG. 4 is a view showing another embodiment of the self detection type probe shown in FIG. 1 and further, is a block diagram showing an example of a capacitance measuring means.

In other words, as shown in FIG. 4, the capacitance measuring means 40 is connected to the sample S and the sample table 8 and the capacitance measuring means 40 is provided with an oscillator 41 that applies an AC voltage to the sample S, a capacitance sensor 42 that is electrically connected to the conducting film 28 of the cantilever 3, and a lock-in amplifier 43 in which the output signal outputted from the capacitance sensor 42 is inputted.

The capacitance sensor 42 is provided with a quasi-microwave oscillator 44 that converts the change of the capacitance of the sample S into an oscillating frequency and an FM demodulator 45 that converts the oscillating frequency converted by the quasi-microwave oscillator 44 into a voltage value of a direct current and outputs it as an output signal. In addition, a reference signal is inputted from the oscillator 41 in the lock-in amplifier 43.

The case of measuring the capacitance change of the surface of the sample S1 by the capacitance measuring means 40 thus configured will be described below.

Upon scanning, the reference signal from the oscillator 41 is inputted in the lock-in amplifier 43. On the other hand, the capacitance sensor 42 may detect the capacitance change between the tip of the probe 2 and the surface of the sample S1. In other words, the quasi-microwave oscillator 44 may convert the change of the capacitance of the sample S into the oscillating frequency, and the FM demodulator 45 may convert this into the voltage value of the direct current and may output it to the lock-in amplifier 43 as the output signal. The lock-in amplifier 43 may detect a signal of the same frequency (a synchronization signal) as the oscillating frequency applied to the sample S with reference to the reference signal among the output signals that are sent from the FM demodulator 45. Thereby, it is possible to detect the change of the capacitance between the probe tip and the sample S due to change of a thickness of a vacant layer formed on the sample S.

Thus, according to the scanning probe microscope having the capacitance measuring means 40, not being affected by the light leak, it is possible to measure the surface shape of the sample S and measure the permittivity distribution of the surface of the sample S1 at the same time with a high degree of accuracy.

In addition, as the electric property information, the potential distribution of the surface of the sample S1 may be measured. In this case, providing vibration means to vibrate the cantilever 3 with a predetermined resonance frequency, the vibration means may apply an AC voltage and a DC voltage between the probe 2 and the surface of the sample S1 with the probe 2 and the surface of the sample S1 put close to each other. Then, the measuring means 12 may be provided with potential measuring means that measures the potential of the surface of the sample S1 on the basis of the change amount of the cantilever 3 with respect to an electrostatic force generated in a composite electric field due to the applied AC voltage and DC voltage.

According to this configuration, not being affected by the light leak, it is possible to measure the surface shape of the sample S and the potential distribution of the surface of the sample S1 at the same time with a high degree of accuracy.

The invented claimed is:

1. A scanning probe microscope comprising:
a self detection type probe structure including a cantilever having an electrically conductive probe at a distal end thereof, a supporting part that supports a base end side of the cantilever in a cantilevered fashion, and a piezoresistance element whose resistance value changes depending on the amount of deflection of the cantilever;
detecting means for applying a predetermined voltage to the piezoresistance element and detecting the value of the current passing through the piezoresistance element so as to detect the amount of deflection of the cantilever;
a sample table for mounting a sample such that a surface of the sample confronts a tip of the probe;
moving means for relatively moving the sample table and the probe tip along X and Y directions that are parallel to the surface of the sample and a Z direction that is perpendicular to the surface of the sample;
control means for controlling the moving means so that a distance between the probe tip and the surface of the sample is fixed and measuring the surface shape of the sample on the basis of the detection result of the detecting means;
applying means for applying a predetermined voltage between the probe and the surface of the sample; and
measuring means, operable simultaneously with the detecting means, for measuring electrical property information caused by the voltage applied by the applying means, the measuring means being electrically connected to the probe by a conducting film formed on the cantilever.

2. The scanning probe microscope according to claim 1;
wherein the probe tip and the surface of the sample are arranged so as to contact each other; and
the measuring means comprises current measuring means for measuring a current flowing between the probe tip and the surface of the sample.

3. The scanning probe microscope according to claim 1;
wherein the probe tip and the surface of the sample are arranged so as to contact each other; and
the measuring means comprises capacitance measuring means for measuring a capacitance between the probe tip and the surface of the sample.

4. The scanning probe microscope according to claim 1;
further comprising vibration means for vibrating the cantilever with a predetermined resonance frequency; and
wherein the probe tip and the surface of the sample are arranged so as to be close to each other;
the applying means applies an AC voltage and a direct current as the predetermined voltage; and
the measuring means comprises potential measuring means for measuring a potential of the surface of the sample on the basis of the deflection amount of the cantilever with respect to a an electrostatic force generated in a composite electric field due to the applied AC voltage and DC voltage.

* * * * *